US012354187B2

(12) United States Patent
Palamadai et al.

(10) Patent No.: US 12,354,187 B2
(45) Date of Patent: Jul. 8, 2025

(54) ADAPTIVE SIMULATION OF CELEBRITY AND LEGACY AVATARS

(71) Applicant: AT&T Intellectual Property I, L.P., Atlanta, GA (US)

(72) Inventors: Rashmi Palamadai, Naperville, IL (US); Brian Novack, St. Louis, MO (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 159 days.

(21) Appl. No.: 18/088,513

(22) Filed: Dec. 23, 2022

(65) Prior Publication Data

US 2024/0212223 A1 Jun. 27, 2024

(51) Int. Cl.
*G06T 11/00* (2006.01)
*G06T 13/00* (2011.01)

(52) U.S. Cl.
CPC ............. *G06T 11/00* (2013.01); *G06T 13/00* (2013.01)

(58) Field of Classification Search
None
See application file for complete search history.

(56) References Cited

U.S. PATENT DOCUMENTS

| 10,551,993 | B1* | 2/2020 | Sanocki | G06F 3/017 |
| 2002/0010584 | A1* | 1/2002 | Schultz | G06Q 99/00 |
| | | | | 704/270 |
| 2009/0099836 | A1* | 4/2009 | Jacobsen | G06F 40/58 |
| | | | | 704/E15.001 |
| 2013/0095924 | A1* | 4/2013 | Geisner | A63F 13/21 |
| | | | | 463/32 |
| 2013/0257877 | A1* | 10/2013 | Davis | G06N 3/006 |
| | | | | 345/473 |
| 2016/0267699 | A1* | 9/2016 | Borke | G06F 3/017 |
| 2018/0096072 | A1* | 4/2018 | He | G06F 16/337 |
| 2019/0189126 | A1* | 6/2019 | Liu | G10L 15/22 |
| 2019/0205727 | A1* | 7/2019 | Lin | G06F 18/217 |
| 2020/0193264 | A1* | 6/2020 | Zavesky | G06N 20/00 |

* cited by examiner

*Primary Examiner* — Jason A Pringle-Parker (57) ABSTRACT

A device, computer-readable medium, and method for adaptive simulation of celebrity and legacy avatars in extended reality environments is disclosed. In one example, a method performed by a processing system including at least one processor includes acquiring preferences from a user with respect to a virtual interaction, matching the preferences to an individual for whom an avatar is available, rendering an extended reality environment in which the virtual interaction will occur, rendering the avatar in the extended reality environment, receiving an input from the user, extracting a meaning from the input, and controlling the avatar to present an output that is responsive to the meaning, wherein the output is generated dynamically using at least one of: an image of the individual, an audio of the individual, or biographical data of the individual.

20 Claims, 3 Drawing Sheets

ADAPTIVE SIMULATION OF CELEBRITY AND LEGACY AVATARS

The present disclosure relates generally to extended reality technology, and relates more particularly to devices, non-transitory computer-readable media, and methods for adaptive simulation of celebrity and legacy avatars in extended reality environments.

BACKGROUND

Extended reality is an umbrella term that has been used to refer to various different forms of immersive technologies, including virtual reality (VR), augmented reality (AR), mixed reality (MR), cinematic reality (CR), and diminished reality (DR). Generally speaking, extended reality technologies allow virtual world (e.g., digital) objects to be brought into "real" (e.g., non-virtual) world environments and real world objects to be brought into virtual environments, e.g., via overlays or other mechanisms. Extended reality technologies may have applications in fields including architecture, sports training, medicine, real estate, gaming, television and film, engineering, travel, and others. As such, immersive experiences that rely on extended reality technologies are growing in popularity.

SUMMARY

In one example, the present disclosure describes a device, computer-readable medium, and method for adaptive simulation of celebrity and legacy avatars in extended reality environments. For instance, in one example, a method performed by a processing system including at least one processor includes acquiring preferences from a user with respect to a virtual interaction, matching the preferences to an individual for whom an avatar is available, rendering an extended reality environment in which the virtual interaction will occur, rendering the avatar in the extended reality environment, receiving an input from the user, extracting a meaning from the input, and controlling the avatar to present an output that is responsive to the meaning, wherein the output is generated dynamically using at least one of: an image of the individual, an audio of the individual, or biographical data of the individual.

In another example, a non-transitory computer-readable medium stores instructions which, when executed by a processing system, including at least one processor, cause the processing system to perform operations. The operations include acquiring preferences from a user with respect to a virtual interaction, matching the preferences to an individual for whom an avatar is available, rendering an extended reality environment in which the virtual interaction will occur, rendering the avatar in the extended reality environment, receiving an input from the user, extracting a meaning from the input, and controlling the avatar to present an output that is responsive to the meaning, wherein the output is generated dynamically using at least one of: an image of the individual, an audio of the individual, or biographical data of the individual.

In another example, a device includes a processing system including at least one processor and a computer-readable medium storing instructions which, when executed by the processing system, cause the processing system to perform operations. The operations include acquiring preferences from a user with respect to a virtual interaction, matching the preferences to an individual for whom an avatar is available, rendering an extended reality environment in which the virtual interaction will occur, rendering the avatar in the extended reality environment, receiving an input from the user, extracting a meaning from the input, and controlling the avatar to present an output that is responsive to the meaning, wherein the output is generated dynamically using at least one of: an image of the individual, an audio of the individual, or biographical data of the individual.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure enhances extended reality applications by adaptively simulating celebrity and legacy avatars in extended reality environments. As discussed above, extended reality technologies allow virtual world (e.g., digital) objects to be brought into "real" (e.g., non-virtual) world environments and real world objects to be brought into virtual environments, e.g., via overlays or other mechanisms. Extended reality technologies therefore enable the creation of immersive and personalized experiences, such as video games that can simulate the feeling of a player being physically present in a digitally rendered environment or the ability to interact with a celebrity, a character, or another individual with whom a user might not have the opportunity to interact in person.

For instance, some XR applications may allow users to simulate an interaction with a celebrity, a former acquaintance, or even an individual who is deceased (e.g., a family member or friend who is deceased, a historical figure, or the like). As an example, an XR application may allow a user to acquire golf advice from a famous golfer, which is something the user may be unable to do in person. However, such applications tend to be fairly limited in the degree of interaction that can be simulated. For instance, many applications use trees to drive the interaction, where the trees offer only a static, limited number of possible avenues of conversation. Thus, the interaction may feel somewhat stilted or unnatural and/or may not address the user's true contextual needs (e.g., a tree for a famous golfer may only be programmed to provide advice on driving and putting, when the user really needs help with chipping).

Examples of the present disclosure enhance extended reality applications by adaptively simulating celebrity and legacy avatars in extended reality environments. In one example, the present disclosure may utilize a combination of natural language processing and artificial intelligence to align the behavior of an avatar (which may represent a celebrity, an old acquaintance, a deceased friend or relative, a historical figure, or any other individuals) with the expectations of a user who is interacting with the avatar. This may provide a more dynamic and more natural interaction than what is possible to provide using conventional XR technology. These and other aspects of the present disclosure are described in greater detail below in connection with the examples of FIGS. 1-3.

Figure 1:
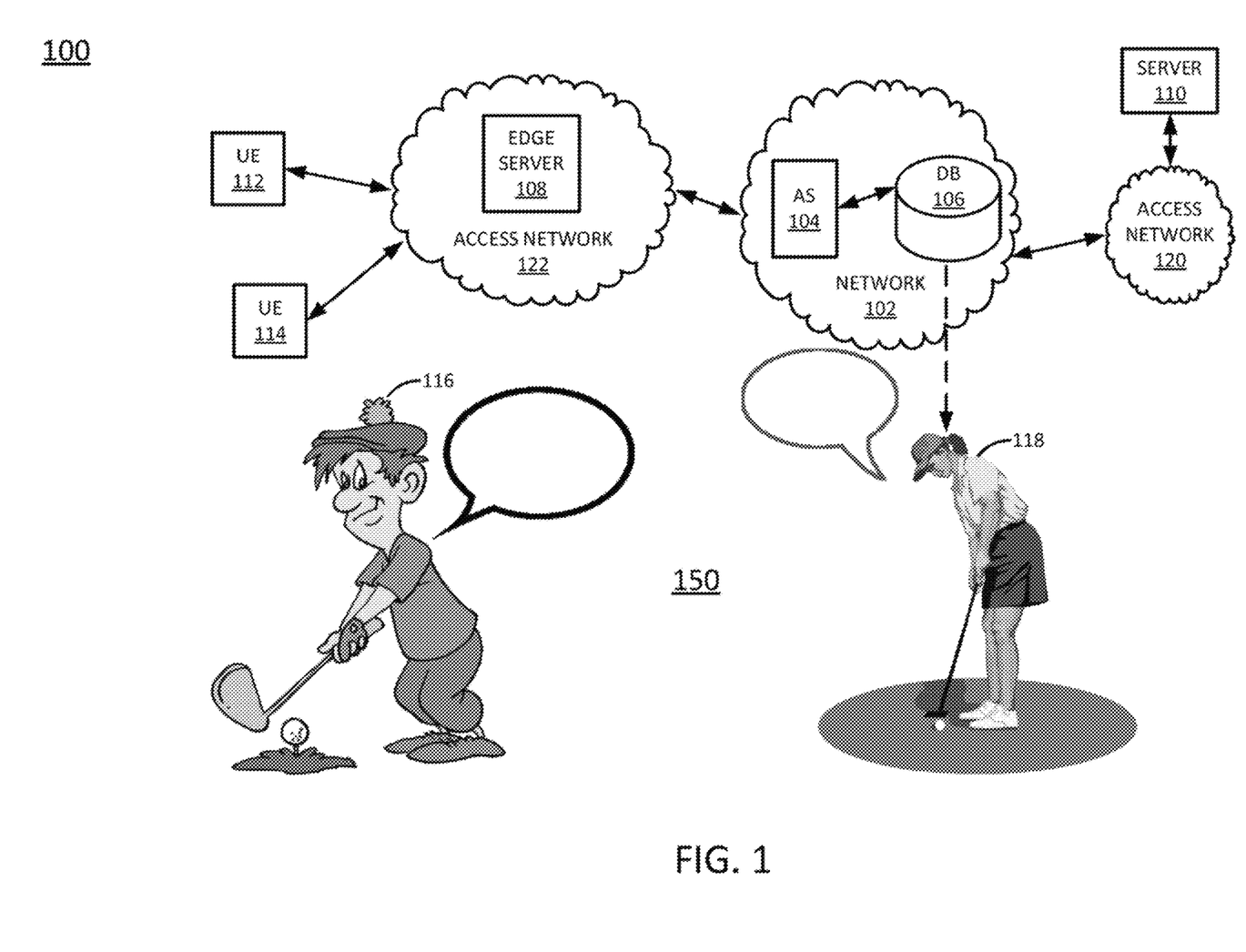
FIG. 1 illustrates an example system in which examples of the present disclosure may operate.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, or an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 3:
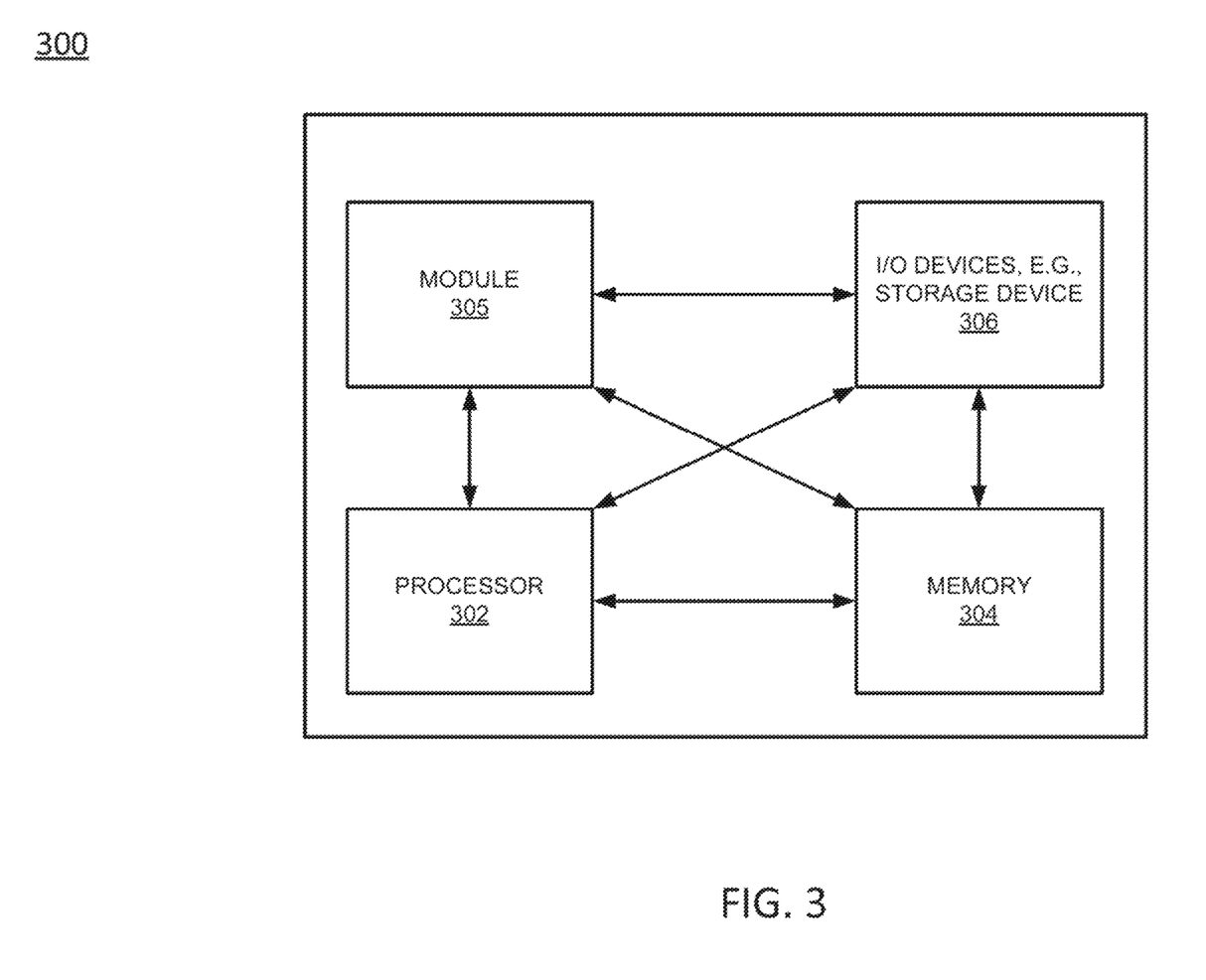
FIG. 3 depicts a high-level block diagram of a computing device specifically programmed to perform the functions described herein.

In accordance with the present disclosure, network 102 may include an application server (AS) 104, which may comprise a computing system or server, such as computing system 300 depicted in FIG. 3, and may be configured to provide one or more operations or functions in connection with examples of the present disclosure for adaptive simulation of celebrity and legacy avatars in extended reality environments. The network 102 may also include a database (DB) 106 that is communicatively coupled to the AS 104.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure. Thus, although only a single application server (AS) 104 and single database (DB) are illustrated, it should be noted that any number of servers may be deployed, and which may operate in a distributed and/or coordinated manner as a processing system to perform operations in connection with the present disclosure.

In one example, AS 104 may comprise a centralized network-based server for adaptive simulation of celebrity and legacy avatars in extended reality environments. For instance, the AS 104 may host an application that renders extended reality environments in which a user may interact with an avatar of a celebrity, a fictional character, a historical figure, a friend or relative who may be deceased or live far away, or the like. The application may be accessible by users utilizing various user endpoint devices. In one example, the AS 104 may be configured to control the avatar to interact with the user in a dynamic, unscripted manner.

In one example, AS 104 may comprise a physical storage device (e.g., a database server), to store profiles for various individuals, where the individuals may include celebrities, fictional characters, historical figures, and other individuals. For instance, the AS 104 may store an index, where the index maps each individual to a profile containing information about the individual which may be used to control a dynamic interaction with a user (e.g., such that the user feels as if the user is having a natural conversation with the individual). As an example, an individual's profile may contain video, images, audio, and the like of the individual's facial features, body type, clothing or costumes, gait, voice, hand gestures, mannerisms, and the like. The profile may also include descriptors that describe how to replicate the appearance and movements of the individual (e.g., special abilities, average speed of gait, pitch of voice, etc.). In one example, the profile may include one or more default avatars for the individual (e.g., one or more avatars wearing particular clothing or carrying particular props). A profile for an individual may also include metadata to assist in indexing, search, and interaction. For instance, the metadata may indicate the individual's age, gender, birthdate, nationality, occupation, professional accomplishments and awards, interests, preferences, hobbies, notable events in the individual's life or career, and other data. In one example, the individual may control how much information is included in his or her profile.

A profile for an individual may also specify a policy associated with the information in the profile. The policy may specify rules or conditions under which the avatar and/or profile information may or may not be used. For instance, the individual may specify that certain topics of conversation are off limits, that his or her avatar cannot perform specific actions (e.g., drinking alcohol, wearing a shirt of a specific sports team or band, etc.), or the like. In a further example, the individual may make different information available to different users (e.g., depending on the users' identity, whether the users are known to the individual, the users' reasons for requesting the information, the users' subscription tiers, or the like).

In one example, the DB 106 may store the index and/or the profiles, and the AS 104 may retrieve the index and/or the profiles from the DB 106 when needed. For ease of illustration, various additional elements of network 102 are omitted from FIG. 1.

Figure 2:
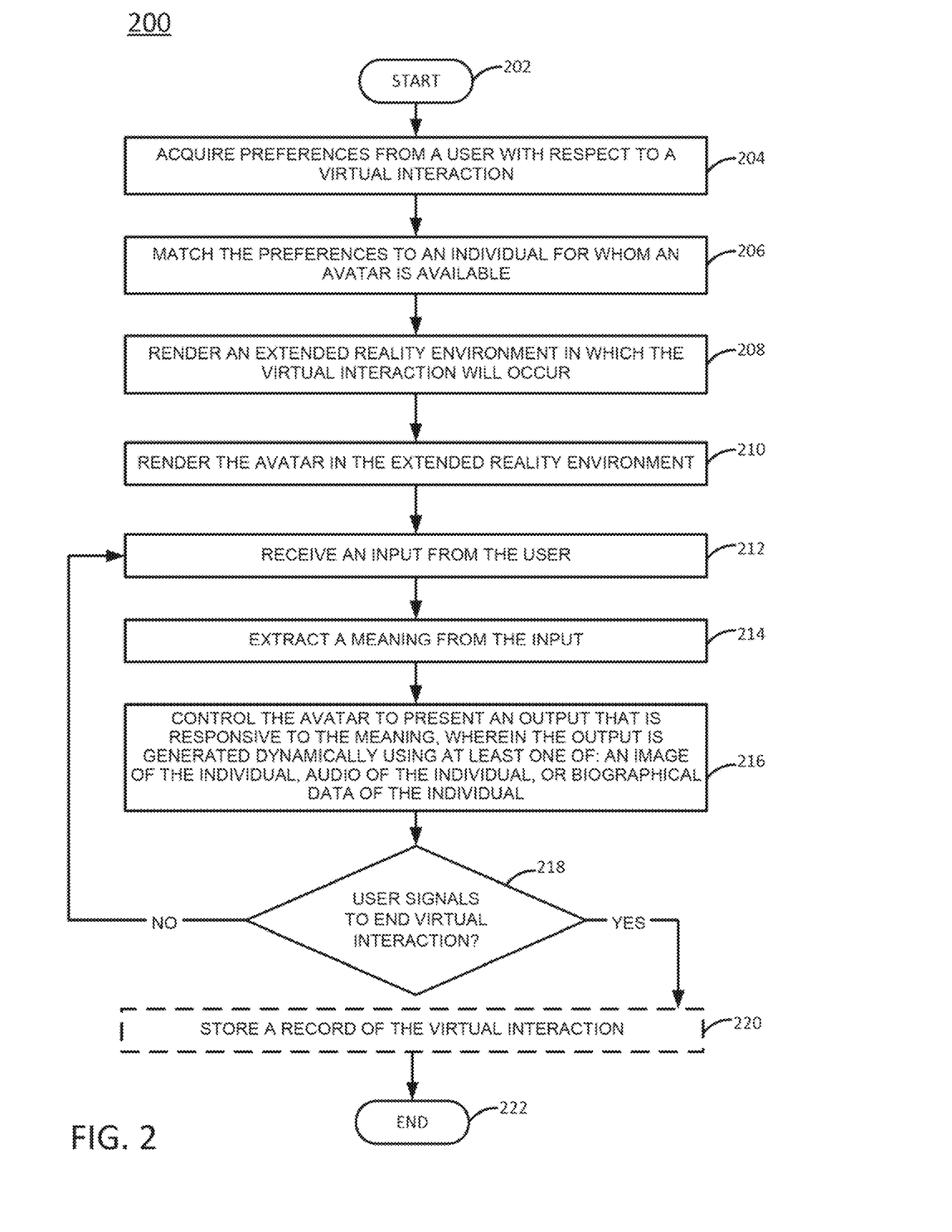
FIG. 2 illustrates a flowchart of an example method for adaptive simulation of celebrity and legacy avatars in extended reality environments, according to examples of the present disclosure.

In one example, access network 122 may include an edge server 108, which may comprise a computing system or server, such as computing system 300 depicted in FIG. 3, and may be configured to provide one or more operations or functions for adaptive simulation of celebrity and legacy avatars in extended reality environments, as described herein. For instance, an example method 200 for adaptive simulation of celebrity and legacy avatars in extended reality environments is illustrated in FIG. 2 and described in greater detail below.

In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components. Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises radio access networks, the nodes and other components of the access network 122 may be referred to as a mobile edge infrastructure. As just one example, edge server 108 may be instantiated on one or more servers hosting virtualization platforms for managing one or more virtual machines (VMs), containers, microservices, or the like. In other words, in one example, edge server 108 may comprise a VM, a container, or the like.

In one example, the access network 120 may be in communication with a server 110. Similarly, access network 122 may be in communication with one or more devices, e.g., user endpoint devices 112 and 114. Access networks 120 and 122 may transmit and receive communications between server 110, user endpoint devices 112 and 114, application server (AS) 104, other components of network 102, devices reachable via the Internet in general, and so forth. In one example, either or both of user endpoint devices 112 and 114 may comprise a mobile device, a cellular smart phone, a wearable computing device (e.g., smart glasses, smart goggles, a virtual reality (VR) headset or other types of head mounted display, or the like), a laptop computer, a tablet computer, or the like (broadly an "XR device"). In one example, either or both of user endpoint devices 112 and 114 may comprise a computing system or device, such as computing system 300 depicted in FIG. 3, and may be configured to provide one or more operations or functions in connection with examples of the present disclosure for simulating likenesses and mannerisms in extended reality environments.

In one example, server 110 may comprise a network-based server for generating extended reality environments. In this regard, server 110 may comprise the same or similar components as those of AS 104 and may provide the same or similar functions. Thus, any examples described herein with respect to AS 104 may similarly apply to server 110, and vice versa. In particular, server 110 may be a component of a system for generating extended reality environments which is not operated by an entity that is not a telecommunications network operator. For instance, a provider of an XR system may operate server 110 and may also operate edge server 108 in accordance with an arrangement with a telecommunication service provider offering edge computing resources to third-parties. However, in another example, a telecommunication network service provider may operate network 102 and access network 122, and may also provide an XR system via AS 104 and edge server 108. For instance, in such an example, the XR system may comprise an additional service that may be offered to subscribers, e.g., in addition to network access services, telephony services, traditional television services, media content delivery service, media streaming services, and so forth.

In an illustrative example, an XR system may be provided via AS 104 and edge server 108. In one example, a user may engage an application on user endpoint device 112 to establish one or more sessions with the XR system, e.g., a connection to edge server 108 (or a connection to edge server 108 and a connection to AS 104). In one example, the access network 122 may comprise a cellular network (e.g., a 4G network and/or an LTE network, or a portion thereof, such as an evolved Uniform Terrestrial Radio Access Network (eUTRAN), an evolved packet core (EPC) network, etc., a 5G network, etc.). Thus, the communications between user endpoint device 112 and edge server 108 may involve cellular communication via one or more base stations (e.g., eNodeBs, gNBs, or the like). However, in another example, the communications may alternatively or additional be via a non-cellular wireless communication modality, such as IEEE 802.11/Wi-Fi, or the like. For instance, access network 122 may comprise a wireless local area network (WLAN) containing at least one wireless access point (AP), e.g., a wireless router. Alternatively, or in addition, user endpoint device 112 may communicate with access network 122, network 102, the Internet in general, etc., via a WLAN that interfaces with access network 122.

In the example of FIG. 1, user endpoint device 112 may establish a session with edge server 108 for adaptive simulation of celebrity and legacy avatars in extended reality environments. For illustrative purposes, the extended reality environment may comprise a virtual golf course 150. On this virtual golf course 150, a user's avatar 116 may interact with the avatar 118 of a famous golfer. The AS 104 may retrieve a profile for the famous golfer and may, if policies associated with the famous golfer allow, insert the avatar 118 of the famous golfer into the extended reality environment 150. The avatar 118 may look, sound, and behave like the famous golfer and have the knowledge and memories of the famous golfer (to the extent that such looks, sounds, behavior, knowledge, and memories are specified in the famous golfer's profile). The user may be able to interact with the famous golfer, via the avatars 116 and 118, to play a round of golf, to ask for advice on their golf skills, or to discuss other subjects. The nature of the interaction is dynamic, as discussed in further detail below. In other words, the interaction does not follow a predefined script or series of predefined scripted avenues of conversation.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 110, or may be provided by AS 104 in conjunction with server 110. For instance, AS 104 and server 110 may be configured in a load balancing arrangement, or may be configured to provide for backups or redundancies with respect to each other, and so forth. Thus, these and other modifications are all contemplated within the scope of the present disclosure.

To further aid in understanding the present disclosure, FIG. 2 illustrates a flowchart of a method 200 for adaptive simulation of celebrity and legacy avatars in extended reality environments in accordance with the present disclosure. In one example, the method 200 may be performed by an XR server that is configured to generate extended reality environments, such as the AS 104 or server 110 illustrated in FIG. 1. However, in other examples, the method 200 may be performed by another device, such as the processor 302 of the system 300 illustrated in FIG. 3. For the sake of example, the method 200 is described as being performed by a processing system.

The method 200 begins in step 202. In step 204, the processing system may acquire preferences from a user with respect to a virtual interaction.

In one example, the preferences may explicit identify an individual with whom the user wishes to interact. For instance, the preferences may identify a specific celebrity, a specific friend or relative of the user, a specific historical figure, a specific fictional character, or the like. For instance, the user may specify the desire to talk to "Grandpa Joe" or "Abraham Lincoln" or "Han Solo." In one example where an explicitly identified individual is not a public figure, the processing system may identify the individual based on the user's contacts or profile settings, or may ask the user for further information about the individual (e.g., provide an image or video of the individual). With no loss of generality, the user may also request or direct the creation of multiple avatars for a common purpose, where the processing system facilitates the creation and interaction of the multiple avatars toward a singular theme. For example, the user may ask to speak with three famous actors from the late 2010's to discuss the implications of virtual media in the actors' respective historical roles.

In another example, the preferences may not identify a specific individual, but may instead identify characteristics of an individual with whom the user wishes to interact or the user's intentions for the interaction (from which necessary characteristics of an individual can be determined). For instance, the preferences may specify that the user wishes to interact with someone who can help in improving the user's golf swing, someone who is an expert on dog training, or someone who lived through a specific historical event. In a further example, the preferences may specify the user's goal for the virtual interaction, such as obtaining personal or professional advice, gathering information to write a book or school paper, or simply catching up with someone the user has not "seen" in a long time.

In step 206, the processing system may match the preferences to an individual for whom an avatar is available. For instance, if the preferences have explicitly identified an individual with whom the user wishes to interact, the processing system may match the identity specified in the preferences to an entry in a database. The entry in the database may include a profile for an individual whose identity matches the identity specified in the preferences.

The profile of the individual may include one or more images of the individual (e.g., taken from one or more different perspectives or views, such as a full body image, a front facial image, a profile facial image, different facial expressions, different hair styles, etc.). Features such as eye color, hair color, scars, badges, freckles, prosthetics, eyeglasses, mobility aids, and the like may be determined from the images. The images may also include video or moving images, from which additional features (e.g., gait, gestures, etc.) can be determined. The profile of the individual may also include text or metadata indicating one or more characteristics of the individual (e.g., age, gender, birthdate, nationality, occupation, professional accomplishments and awards, interests, preferences, hobbies, etc.). In a further example, the profile may include audio of the individual, from which additional features (e.g., accent, vernacular, slang expressions, speech inflections, etc.) can be extracted. In a further example, some of these features (e.g., vernacular, slang expressions, etc.) can also be determined from text-based online interactions in the individual's online history (e.g., social media, published writings, etc.).

In another example, if the preferences do not explicitly identify an individual with whom the user interacts, but instead identify the user's intentions for the interaction, then the processing system may attempt to infer characteristics from the intentions, where the characteristics may be matched to a profile for an individual. For instance, if the user's intention is to get help improving the user's golf swing, then the processing system may infer that the desired individual should be knowledgeable about golf (e.g., as a professional, semi-professional, or collegiate player, as a coach, as an analyst, or the like). In one example, metadata associated with the profiles for the individuals may be matched to keywords in the user preferences in order to identify individuals who match the preferences.

In one example, the processing system may identify one or more profiles for individuals who most closely match the preferences, if an exact match cannot be identified. In this case, it may be possible for the processing system to utilize a closest matching profile as a starting point, and then adapt that profile to either modify an avatar associated with the individual or to create an entirely new avatar (with an associated profile) that more closely matches the preferences.

In one example, if the preferences match profiles for multiple individuals, the processing system may recommend that the user select one individual from the multiple individuals (or ask the user to provide further preferences from which the processing system may attempt to narrow down a match).

In some examples, the processing system may look to beyond the preferences acquired in step 204 to other, more general user preferences in order to match the preferences to an individual. For instance, the processing system may consult a profile for the user, social media postings of the user, previous XR interactions in which the user participated, or the like to identify additional preferences of the user. For instance, referring again to the example in which the user is seeking help to improve the user's golf swing, the processing system may identify multiple profiles for individuals who may be helpful to the user. However, the processing system may determine that the user has previously interacted with an avatar of one specific professional golfer and has rated the interaction highly, or that the user follows the one specific professional golfer on social media. Thus, the further user preferences may help the processing system to disambiguate among multiple potential choices.

In one example, individuals for whom avatars are available may have registered with or opted into an XR application that utilizes the avatars. For instance, any individual for whom an avatar is available may have provided explicit permission for the individual's likeness, voice, and the like to be used to render an avatar. In further examples, an individual may provide video images, still images, audio samples, biographical data, trivia, and/or other media or data that may be used to render an avatar. In a further example, an individual may limit which users have access to which media or data when rendering avatars. For instance, an actor may provide twenty video clips of himself plus some biographical data. However, users who are subscribed to a "basic" tier of the XR application may only have access to five of these video clips when rendering an avatar, while users who subscribe to a "premium" tier of the XR application may have access to all twenty video clips plus the biographical data. In a further example, all users may automatically have access to five of the video clips, and access to further video clips and/or biographical data may be granted by the actor upon request. Thus, the individuals for whom avatars are available may be able to control how their avatars are presented and what level of detail or personal information is made available to users.

In yet another example, the user may ask for a behavior or trait that is atypical for the expected interactions of the individual who the avatar represents. For example, if the avatar represents a famous scientist, the user may prefer to add a sarcastic or comical component to all of the avatar's responses. These components may be specified by the user through content examples, dialogs, references to other famous celebrities or existing avatars, or other mechanisms. Depending on the rights and privileges associated with the avatar's original content (e.g., the individual's estate or surviving family members may prefer to never have the individual be presented acting in a comedic fashion, or the user's "basic" tier subscription may forbid a significant personality change), the processing system may permit or deny such a behavioral addition.

In step 208, the processing system may render an extended reality environment in which the virtual interaction will occur. In one example, the extended reality environment may comprise a real world environment into which virtual, digitally created objects may be inserted. For instance, a viewer may view a real world environment through the lenses of head mounted display (e.g., a pair of smart glasses). The head mounted display may display an overlay that includes a plurality of virtual objects, so that when a view of the overlay is superimposed over the view of the real world environment, an extended reality environment in which the virtual objects appear in the real world environment may be viewed. In another example, the extended reality environment may comprise an entirely virtual, digitally created environment that is presented in a manner that makes the user feel as if they are present in the digitally created environment (e.g., the surrounding real world environment may not be visible).

In one example, the extended reality environment may emulate a real world location, which may be selected by the user. For instance, depending on the nature of the interaction, the extended reality environment may emulate the user's living room, the home of someone the user knows or is related to, a coffee shop, an office, a golf course, or any other locations.

In step 210, the processing system may render the avatar in the extended reality environment. As discussed above, the avatar may be rendered in a manner such that the avatar looks, sounds, and behaves like the individual. For instance, for an individual who has opted into having his or her avatar made available for user interactions, the individual may have some design input into the visual appearance of the avatar. The individual may also provide audio clips that may be used to ensure that the avatar sounds like the individual. Furthermore, if the individual uses any distinct mannerisms, gestures, or catchphrases, the avatar may be programmed to utilize those distinct mannerisms, gestures, or catchphrases.

In another example where the individual has not opted into having his or her avatar made available for user interactions, the user (or someone else, such as a family member) may provide the processing system with video clips, still images, audio clips, and the like in order to assist the processor in creating an avatar for the individual. For instance, if the individual is the user's deceased grandfather, the user may provide family photos, home videos, and the like to assist the processing system in creating the avatar. The user may also provide some design input into the visual appearance of the avatar (e.g., "make his hair whiter" or "make him two inches shorter").

In yet another example, the avatar may interact with the user through other pieces of content sent through various communication channels that give the illusion of a more complex avatar. For example, speech synthesis, simulated "selfie" or instructional photos or videos, and digital correspondence may be simulated and precisely timed in an interactive exchange with the user. The difference in this case from a "full" avatar is the reduced computational burden in providing a full likeness (e.g., of a celebrity). Instead, the processing system may perform smaller simulations or modifications of prior content to match the user's needs (e.g., if vocal encouragement and coached advice for golf swings is sufficient to meet the user's needs, perhaps an XR-based avatar may never be utilized).

In step 212, the processing system may receive an input from the user. For instance, in one example, the user may say something to the avatar. The input may comprise a verbal statement or question (e.g., a spoken greeting), a gesture (e.g., waving "hello"), a typed (e.g., text-based) statement or question, or another form of input.

In step 214, the processing system may extract a meaning from the input. For instance, if the input is a verbal or typed input, the processing system may use natural language processing and/or sentiment recognition to determine the meaning of the input. As an example, the processing system may determine that the user is asking a question and may determine what information the user is asking for. For instance, the question may be, "What is your favorite golf course to play?" In this case, the processing system may determine that the user wants to know the favorite golf course of a specific professional golfer.

If the input is a gesture, the processing system may have access to a gesture-to-meaning library that may be used to translate the gesture into the meaning. As an example, the user may swing a golf club, and then look back at the avatar. This may be interpreted as the user asking whether anything looked wrong with their swing. In a further example, a gesture may include American Sign Language or a similar gesture-based language.

In step 216, the processing system may control the avatar to present an output that is responsive to the meaning, wherein the output is generated dynamically using at least one of: an image of the individual, audio of the individual, or biographical data of the individual. For instance, if the meaning is a query (i.e., the user has posed a question), then the avatar may be controlled to present an answer to the query. In one example, presenting the answer may first involve determining the answer to the query. For instance, if the query asked for a professional golfer's favorite golf course, then the processing system may consult a profile of the professional golfer or some other data source (e.g., a public or proprietary data source) in order to identify the professional golfer's favorite golf course.

Once the content of the output (e.g., an answer to a query) has been determined, the avatar may next be controlled to deliver or present the content. In one example, controlling the avatar includes controlling an appearance of the avatar. For instance, still images and videos of the individual may be consulted to determine the types of facial expressions the individual might make when discussing certain subjects (e.g., how the professional golfer might smile when discussing his or her favorite golf course, to continue the above example). The still images and videos may also be used to determine what types of mannerisms the individual might make (e.g., does he talk with his hands a lot, does his expression become very animated, etc.?). These facial expressions, mannerisms, and the like may be mimicked by the avatar.

In a further example, controlling the avatar also includes controlling a sound of the avatar. For instance, videos and audio clips of the individual may be consulted to determine what the individual's voice sounds like (e.g., regional accent, pitch, etc.). The videos and audio clips may also be used to determine any unusual vocal qualities of the individual (e.g., does he pronounce a particular word in an unusual way, does he have a vocal fry, does he say "um" frequently, etc.?). The sound of the individual's voice, unusual vocal qualities, and the like may be mimicked by the avatar.

In a further example, controlling the avatar also includes including information about the individual in the content of the output. For instance, biographical data of the individual could be used to customize the content of the output which may include personal information about the individual. As an example, the individual may recount a story from his past that is relevant to the input, may answer a question about himself (e.g., his favorite book, movie, or television show, where he went to school, what he does to stay healthy, etc.), or the like. The biographical data may be used to help the avatar respond to the input as the individual would.

In one example, the processing system may select the action, mannerism, facial expression, or the like from the profile which best suits the current context of the virtual interaction and may superimpose the action, mannerism, facial expression, or the like onto the avatar.

In another example, if sufficient reference content (e.g., images, audio, video, or the like) does not exist to allow rendering a modified representation of the avatar, the avatar can be controlled to react with a direct or indirect "out of domain" response. In a direct out of domain response, the avatar may vocalize or otherwise communicate that insufficient data exists (e.g., by saying "I'm afraid I can't quite imagine what that would look like" or "That's something I don't know about"). In an indirect out of domain response, the avatar may use a mannerism that is consistent with its impersonated identity to deflect or redirect the interaction. In this mannerism, the avatar may create a response that returns to a topic that was previously discussed, the avatar may branch to a related but new topic, or the avatar may deflect and ask a question of the user instead. Each of these mannerisms may be customized for the pertinent identity, e.g., like a grandmother avatar branching to a new topic with "did I ever tell you about the time," or a professional coach avatar deflecting with "that is a great question, how do you believe this will affect your gameplay?"

In step 218, the processing system may determine whether the user has signaled that the user wishes to end the virtual interaction. For instance, in one example, the user may hit a button or speak a predetermined command word or phrase (e.g., "Done") in order to signal that the virtual interaction is over. In another example, the user's wish to end the virtual interaction may be inferred from his or her statements or actions. For instance, the user may say "Thank you for your time," "Have a nice day," or "Goodbye," to the avatar. In another example, a time limit may be imposed on the virtual interaction, and the processing system may determine when the time limit has expired.

In one example, the processing system may confirm that the user wishes to end the virtual interaction. For instance, the processing system may present a visual dialog in the extended reality environment or may play an audio recording asking the user whether the user wants to end the virtual interaction (e.g., to say "yes" or "no" out loud, to make a specific gesture to indicate "yes" or "no," to press a particular button for "yes" or "no," or the like). If a time limit is imposed on the virtual interaction, the processing system may present the user with an option to extend the virtual interaction (e.g., by paying a fee, exchanging some form of virtual currency, or the like).

If the processing system concludes in step 218 that the user has not signaled that the user wishes to exit the extended reality environment, then the method 200 may return to step 212 and proceed as described above to respond to further user inputs. Thus, the virtual interaction may continue in a dynamic manner.

If, however, the processing system concludes in step 218 that the user has signaled that the user wishes to exit the extended reality environment, then the method 200 may proceed to step 220.

In optional step 220 (illustrated in phantom), the processing system may store a record of the virtual interaction. In one example, the record of the virtual interaction may comprise a video recording, an audio recording, or a transcript of all or part of the virtual interaction. In another example, the record of the virtual interaction may comprise a summary of the virtual interaction (e.g., the individual(s) with whom the user interacted via avatar(s), when the virtual interaction took place (e.g., date and/or time), the length of time for which the virtual interaction lasted, subjects discussed during the virtual interaction, any user feedback about the virtual interaction, and/or other information about the virtual interaction). The record of the virtual interaction may also indicate the source(s) of any data that was used to control the avatar and generate output presented by the avatar.

In one example, the record may be stored in a manner that is accessible to the user. Storing the record may allow the user to replay the virtual interaction in the extended reality environment at a later time or even in other extended reality environments. Storing the record may also allow the user to share the user's virtual interaction with other users, if permitted by the individual represented by the avatar.

In a further example, the record may be stored in a manner that is accessible to the individual represented by the avatar. Storing the record may allow the individual represented by the avatar to see how his or her avatar is being used in extended reality environments. Having this information may allow the individual represented by the avatar to make more informed decisions when determining how and whether to make modifications to the avatar, how and whether to alter any licensing fees associated with use of the avatar, how and whether to alter any policies or limitations associated with use of the avatar, and the like. For instance, if the individual represented by the avatar finds that the avatar is being used to say things that the individual does not agree with (e.g., cheer for a specific baseball team, express support for a specific politician, etc.) or do things the individual would not do (e.g., wear a leather jacket when the individual is a vegan, drink a beer when the individual does not consume alcohol, etc.), the individual may set limitations on use of his or her avatar to ensure that no future uses of his or her avatar would say or would do those things.

In a further example, storing the record may allow the processing system to learn from the record. For instance, records for a plurality of the user's virtual interactions could be used to train a machine learning model to predict which individuals' avatars the user responds best to, to learn what the processing system may get right or wrong about simulating an individual's appearance, voice, behavior, or the like via the avatar, and to learn other user preferences. This may in turn help the processing system to make better recommendations to the user in the future (e.g., to fine tune the matching of avatars to the user's preferences, to refine the presentation of the avatars, etc.).

In a further example, storing the record may allow the processing system to alert the user when new information that is relevant to a prior virtual interaction becomes available. For instance, the user may have had a virtual interaction in which the user interacted with an avatar of his or her favorite musician to discuss the musician's latest album. Sometime after the virtual interaction, the album may be nominated for one or more awards, and the processing system may alert the user to the nominations. Similarly, a user may have interacted with the avatar of a favorite author to ask questions about one of the author's book series. Sometime later, the author may announce the publication of a new book in the series, and the processing system may alert the user to the publication of the new book.

The method 200 may end in step 222.

Thus, examples of the present disclosure enhance extended reality applications by adaptively simulating celebrity and legacy avatars in extended reality environments. In one example, the present disclosure may utilize a combination of natural language processing and artificial intelligence to align the behavior of an avatar (which may represent a celebrity, an old acquaintance, a deceased friend or relative, a historical figure, or any other individual) with the expectations of a user who is interacting with the avatar. This may provide a more dynamic and more natural interaction than what is possible to provide using conventional XR technology.

For instance, by freeing the interaction from the constraints of a static predefined tree, a wider variety of interactions accommodating a wider variety of user preferences and requests may be possible. As an example, a user may be able to get cooking instructions from a popular cartoon character, or submit queries such as "what would this celebrity dog trainer do in this situation?"

Moreover, although the method 200 discusses the presentation of one avatar to a user, it will be appreciated that more than one avatar may be rendered for interaction with the user. For instance, if the user asks a question that cannot be answered via a first avatar of a first individual, the interaction could be redirected to a second avatar of a second individual, or the second avatar could be introduced into the interaction with the user and the first avatar. This may provide the benefit of additional perspectives or the ability to fill in knowledge gaps.

Further examples could be used to help users obtain expert advice (e.g., for sports coaching, academic research, therapy purposes, or the like) that the users might not otherwise have access to. For instance, avatars may be matched to a user's contextual needs and queries as well as the user's personality, interests, and current emotional state, where the avatars represent the system's belief of the "best person" to address the contextual needs and queries. The individuals who the avatars represent may define the level of interaction they are willing to provide (e.g., most prescripted content versus mostly dynamically generated content), and the users may choose avatars based on the provided level of interaction.

Further examples of the present disclosure could be used to assist individuals in recording messages for loved ones. For instance, a person could record a personalized message for a family member, where the personalized message could be further customized to a specific scenario (e.g., a birthday, a wedding, etc.). In this way, individuals may be able to provide personalized, interaction experiences for loved ones, even when the individuals cannot be with their loved ones in person.

Further examples of the present disclosure could be used to create "time capsules." For instance, specific historical events may be addressed in different ways by different individuals. As an example, a user may wish to ask a famous deceased scientist about his views on a particular scientific subject for which new information has recently been discovered.

In further examples, themed amalgamations of content may be generated to present insight into various aspects of a public figure's life. For instance, an XR immersion could be generated to show what it was like for a particular celebrity to grow up on a farm or to meet another celebrity that he or she admired at an event.

Further examples of the present disclosure may be integrated with "living in place" systems. For instance, an avatar of a celebrity may be controlled to recall events that correlate to experiences in a user's life. As an example, if the system detects (e.g., through natural language processing of a conversational input) that the user once saw a famous musician perform, an avatar of the famous musician could be presented. The avatar could sing to the user or talk about the time that the user saw the famous musician performed.

In further examples, playback of scenario-based responses could be enabled for avatars of public figures. For instance, an avatar of a political candidate who lost an election could be presented to discuss how he or she would have reacted if he or she had won, how he or she would have responded to certain world events, or the like. In this case, the public figure represented by the avatar may provide content for the avatar to utilize (e.g., unreleased recordings or the like).

In further examples, the processing system may initiate real-world actions in response to a virtual interaction. For instance, the processing system may infer, based on a user's speech slurring or becoming disjointed, that the user may be experiencing a medical emergency (e.g., a stroke). In this case, the processing system may initiate a call to emergency services and may provide any known information that may help emergency services in assisting the user (e.g., physical address, symptoms observed, how long the symptoms have been observed, etc.). In other examples, the processing system may initiate retrieval of digital documents (e.g., where the user is discussing a historical document with a historical figure, a digital copy of the historical document may be retrieved). In another example where consultation with a third party (e.g., a party other than the user or the processing system) may be needed, the processing system may initiate a call or other types of communication to the third party. In another example, the processing system may schedule appointments on the user's behalf (e.g., an appointment with a doctor, a restaurant reservation, etc.).

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, a server (such as might be used to perform the method 200) could be implemented as illustrated in FIG. 3.

As depicted in FIG. 3, the system 300 comprises a hardware processor element 302, a memory 304, a module 305 for adaptive simulation of celebrity and legacy avatars in extended reality environments, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for adaptive simulation of celebrity and legacy avatars in extended reality environments may include circuitry and/or logic for performing special purpose functions relating to the operation of a home gateway or XR server. The input/output devices 306 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for adaptive simulation of celebrity and legacy avatars in extended reality environments (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for adaptive simulation of celebrity and legacy avatars in extended reality environments (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
acquiring, by a processing system including at least one processor, preferences from a user with respect to a virtual interaction;
matching, by the processing system, the preferences to multiple individuals for whom avatars are available in a database, wherein the processing system relies on at least one further preference of the user to select a single individual from among the multiple individuals;
rendering, by the processing system, an extended reality environment in which the virtual interaction will occur;
rendering, by the processing system, the avatar of the single individual in the extended reality environment;
receiving, by the processing system, an input from the user;
extracting, by the processing system, a meaning from the input; and
controlling, by the processing system, the avatar of the single individual to present an output that is responsive to the meaning, wherein content of the output is generated dynamically without relying on a set of predefined scripts using at least one of: an image of the single individual, an audio of the single individual, or biographical data of the single individual.

2. The method of claim 1, wherein the preferences explicitly identify the multiple individuals as someone with whom the user wishes to interact.

3. The method of claim 1, wherein the preferences identify characteristics of someone with whom the user wishes to interact, and the characteristics are characteristics of the multiple individuals.

4. The method of claim 1, wherein the preferences identify at least one intention of the user for the virtual interaction.

5. The method of claim 1, wherein the matching comprises matching keywords from the preferences to metadata associated with a respective profile of each of the multiple individuals.

6. The method of claim 5, wherein the respective profile includes: the image of each respective individual, a video of each respective individual, the audio of each respective individual, or the biographical data of each respective individual.

7. The method of claim 5, wherein the respective profile comprises a profile for which the metadata most closely matches the keywords, and the rendering comprises adapting the avatar of the single individual to more closely match the preferences.

8. The method of claim 1, wherein the single individual has opted into making the avatar of the single individual available for virtual interactions.

9. The method of claim 1, wherein the single individual is a celebrity, a fictional character, or a historical figure.

10. The method of claim 1, wherein the input comprises at least one of: a verbal statement, a verbal question, a gesture, a typed statement, or a typed question.

11. The method of claim 1, wherein the input comprises a query, and the controlling comprises controlling the avatar of the single individual to present an answer to the query.

12. The method of claim 1, wherein the controlling comprises controlling an appearance of the avatar of the single individual to resemble the single individual.

13. The method of claim 1, wherein the controlling comprises controlling a sound of the avatar of the single individual to sound like the single individual.

14. The method of claim 1, wherein the controlling comprises controlling a behavior of the avatar of the single individual to behave like the single individual.

15. The method of claim 1, wherein the controlling the avatar of the single individual comprises including information about the single individual in the content of the output.

16. The method of claim 1, further comprising:
storing a record of the virtual interaction.

17. The method of claim 16, wherein the record comprises at least one of: a video recording of at least a part of the virtual interaction, an audio recording of at least a part of the virtual interaction, or a transcript of at least a part of the virtual interaction.

18. The method of claim 16, wherein the record comprises at least one of: an identity of the single individual, a time that the virtual interaction took place, a length of time for which the virtual interaction lasted, a subject discussed during the virtual interaction, user feedback about the virtual interaction, or a source of any data that was used to control the avatar of the single individual and to generate the output.

19. A non-transitory computer-readable medium storing instructions which, when executed by a processing system including at least one processor, cause the processing system to perform operations, the operations comprising:
acquiring preferences from a user with respect to a virtual interaction;
matching the preferences to multiple individuals for whom avatars are available in a database, wherein the processing system relies on at least one further preference of the user to select a single individual from among the multiple individuals;
rendering an extended reality environment in which the virtual interaction will occur;
rendering the avatar of the single individual in the extended reality environment;
receiving an input from the user;
extracting a meaning from the input; and
controlling the avatar of the single individual to present an output that is responsive to the meaning, wherein content of the output is generated dynamically without relying on a set of predefined scripts using at least one of: an image of the single individual, an audio of the single individual, or biographical data of the single individual.

20. A device comprising:

a processing system including at least one processor; and a computer-readable medium storing instructions which, when executed by the processing system, cause the processing system to perform operations, the operations comprising:

acquiring preferences from a user with respect to a virtual interaction;

matching the preferences to multiple individuals for whom avatars are available in a database, wherein the processing system relies on at least one further preference of the user to select a single individual from among the multiple individuals;

rendering an extended reality environment in which the virtual interaction will occur;

rendering the avatar of the single individual in the extended reality environment;

receiving an input from the user;

extracting a meaning from the input; and controlling the avatar of the single individual to present an output that is responsive to the meaning, wherein content of the output is generated dynamically without relying on a set of predefined scripts using at least one of: an image of the single individual, an audio of the single individual, or biographical data of the single individual.

* * * * *